United States Patent
Yoshida

[11] Patent Number: 6,002,821
[45] Date of Patent: Dec. 14, 1999

[54] OPTICAL DATA TRANSMISSION APPARATUS

[75] Inventor: Hideki Yoshida, Kanagawa, Japan

[73] Assignee: Sony Corporation, Tokyo, Japan

[21] Appl. No.: 09/038,165

[22] Filed: Mar. 11, 1998

[30] Foreign Application Priority Data

Mar. 21, 1997 [JP] Japan ..................................... 9-067733

[51] Int. Cl.$^6$ ...................................................... G02B 6/28
[52] U.S. Cl. ................................ 385/24; 385/28; 385/32; 385/36
[58] Field of Search .......................................... 385/24–39

[56] References Cited

U.S. PATENT DOCUMENTS 5,715,339  2/1998  Takai et al. ................................ 385/24

*Primary Examiner*—Phan T. H. Palmer
*Attorney, Agent, or Firm*—Ronald P. Kananen; Rader, Fishman & Grauer

[57] ABSTRACT

An optical transmitting/receiving apparatus comprises a laser and an optical detector. The optical transmitting/receiving apparatus is connected to an optical fiber by a coupling mechanism in such a way that the optical fiber can be connected and disconnected to and from the optical transmitting/receiving apparatus with a high degree of freedom. An optical signal transmitted by the laser is supplied to the optical fiber. On the other hand, an inputting optical signal received through the optical fiber and a loopback optical signal are supplied to the optical detector. A signal output by the optical detector is supplied to a receiving circuit. When a self-diagnosis of the optical transmitting/receiving apparatus is carried out, the optical fiber is disconnected from the optical transmitting/receiving apparatus. In the self-diagnosis, a loopback control circuit generates a driving circuit control signal in accordance with a loopback control signal. The driving circuit control signal is supplied to a driving circuit for driving the laser in order to adjust the optical signal output by the laser.

21 Claims, 2 Drawing Sheets

OPTICAL DATA TRANSMISSION APPARATUS

BACKGROUND OF THE INVENTION

The present invention relates to an optical communication apparatus suitable for two-way optical communication.

There has been known an optical transmitting/receiving apparatus capable of carrying out two-way optical communication of optical signals by using a transmitting unit and a receiving unit through an optical fiber.

A self-diagnosis is carried out in such an optical transmitting/receiving apparatus by transmitting an optical signal from the transmitting unit thereof to its receiving unit by way of a loopback optical fiber.

By the way, in order to carry out a self-diagnosis in the normal usage of two-way optical communication, it is necessary to connect a loopback optical fiber prepared separately, giving rise to a problem that the self diagnosis can not be performed with ease.

SUMMARY OF THE INVENTION

It is thus an object of the present invention to provide an optical transmitting/receiving apparatus that has a built-in loopback function.

In order to solve the problem described above, the present invention provides an optical transmitting/receiving apparatus comprising:

a transmitting means for transmitting an optical signal through an optical fiber which is installed so as to have an end surface thereof face the optical transmitting/receiving apparatus in such a way that the optical fiber can be connected and disconnected to and from the optical transmitting/receiving apparatus with a high degree of freedom; and a receiving means for receiving an inputting optical signal transmitted thereto through the optical fiber, the transmitting/receiving apparatus further having:

a loopback means looping back an optical signal transmitted by the transmitting means to the receiving means; and a transmission level controlling means for controlling the level of an optical signal transmitted by the transmitting means.

BRIEF DESCRIPTION OF THE DRAWINGS

Embodiments of the present invention will be described with reference to the following diagrams wherein.

DETAILED DESCRIPTION OF THE PREFERRED EMBODIMENTS

The present invention will become more apparent from the following detailed description of some preferred embodiments with reference to the accompanying diagrams.

Figure 1:
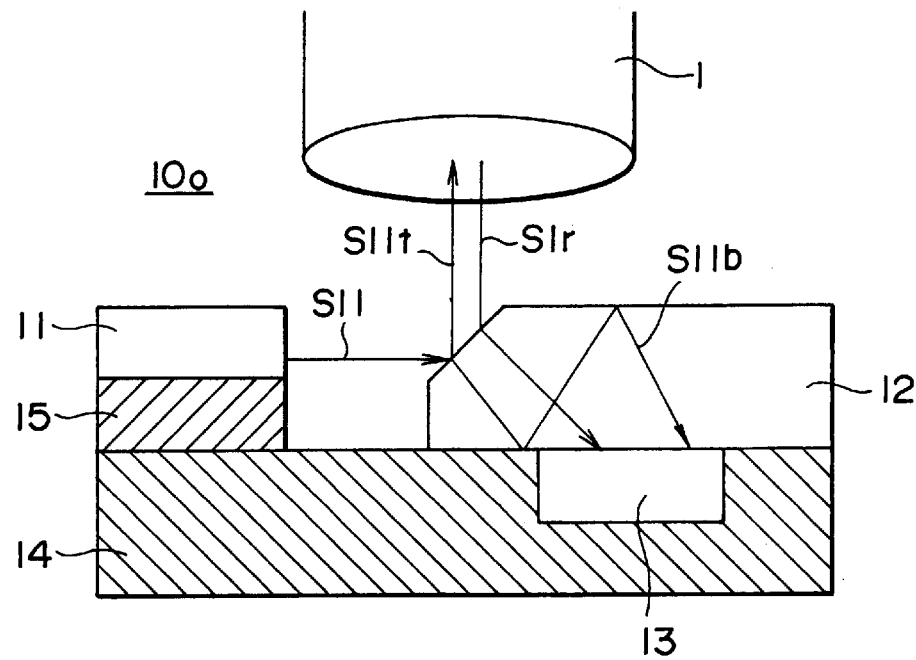
FIG. 1 is a cross-sectional diagram showing the configuration of main elements composing an embodiment implementing an optical transmitting/receiving apparatus provided by the present invention.
Figure 2:
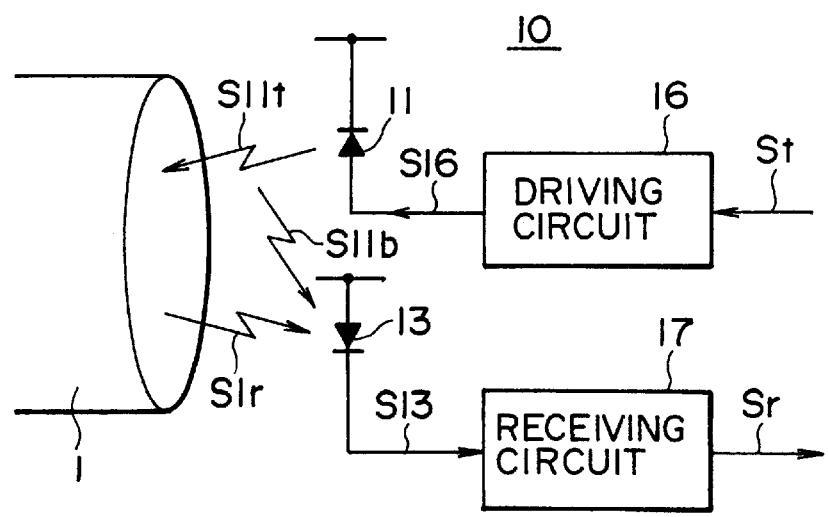
FIG. 2 is a block diagram showing the configuration of the embodiment of the present invention.

The configuration of main elements composing a first embodiment of the present invention is shown in FIG. 1 and an overall configuration of the first embodiment is shown in FIG. 2.

As shown in FIG. 1, an optical system 10o of an optical transmitting/receiving apparatus provided by the present invention comprises a laser 11, a prism 12, an optical detector 13, an optical detector board 14 and an offset member 15. The optical transmitting/receiving apparatus is connected to an optical fiber 1 through a proper coupling mechanism in such a way that the optical fiber 1 can be connected and disconnected to and from the optical transmitting/receiving apparatus with a high degree of freedom. It should be noted that the coupling mechanism itself is not shown in the figure. The optical transmitting/receiving apparatus is installed so as to face an end surface (unnumbered) of the optical fiber 1, that end surface functioning as the optical energy input/output port of the optical fiber.

At one end of the optical detector board 14, the laser 11 is mounted to sandwich the offset member 15. At the other end of the optical detector board 14, the optical detector 13 is created and covered with the prism 12 which faces the laser 11. As shown, the prism 12 includes a surface (unnumbered) that is inclined relative to the laser 11 and the end surface of the optical fiber 1.

In the laser 11, an electrical signal to be transmitted is converted into an optical signal S11 which is then emitted in the direction of the prism 12.

Part of the output optical signal S11 is reflected by the prism 12 and then radiated to the inside of the optical fiber 1 as a transmitted optical signal S11t. The rest of the output optical signal S11 is reflected inside the prism 12 repeatedly and then radiated to the optical detector 13 as a loopback optical signal S11b.

The transmitted optical signal S11t reflected by the prism 12 propagates through the inside of the optical fiber 1, arriving at an optical transmitting/receiving apparatus of a communication partner which is not shown in the figure. On the other hand, an inputting optical signal S1r transmitted by the communication partner through the optical fiber 1 enters the prism 12.

The received optical signal S1r and the loopback optical signal S11b are each converted into an electrical signal by the optical detector 13.

In a driving circuit 16 employed in the optical transmitting/receiving apparatus 10 implemented by the embodiment shown in FIG. 2, a laser driving signal S16 is generated in accordance with a transmitted signal St and supplied to the laser 11. In a receiving circuit 17, on the other hand, a received current signal supplied thereto from the optical detector 13 is converted into a voltage signal which is then amplified and waveshaped before being output as a received signal Sr.

In the present embodiment, when transmitting or receiving a signal to or from a transmitting/receiving apparatus of a communication partner through the optical fiber 1, part of an optical signal output by the laser 11, that is, the loopback optical signal S11b, is supplied to the optical detector 13 in addition to the optical signal S1r received from the communication partner.

In this case, since the loopback optical signal S11b appears to the received optical signal S1r as noise, the optical transmitting/receiving apparatus 10 is designed so that the level of the loopback optical signal S11b is sufficiently low in comparison with the received optical signal S1r. However, the level of the loopback optical signal S11b must be high enough so that the optical detector 13 is capable of receiving the loopback optical signal S11b normally.

In addition, in this embodiment, when a shipping test or a self-diagnosis is carried out, the optical transmitting/receiving apparatus 10 is disconnected from the optical fiber 1. In essence, the received optical signal S1r does not exist anymore. In this state, only the loopback optical signal S11b, that is, part of the signal transmitted by the laser 11, is received by the optical detector 13.

In such a configuration, the transmitted optical signal can thus be looped back to the receiving circuit without the necessity to specially prepare a separate optical fiber for the loopback purpose, allowing an external effect of the existence of the optical fiber to be avoided. As a result, a shipping test and a self-diagnosis of the optical transmitting/receiving apparatus including optical devices can be carried out with ease, allowing a problem that would otherwise be encountered in the field to be identified easily.

Figure 3:
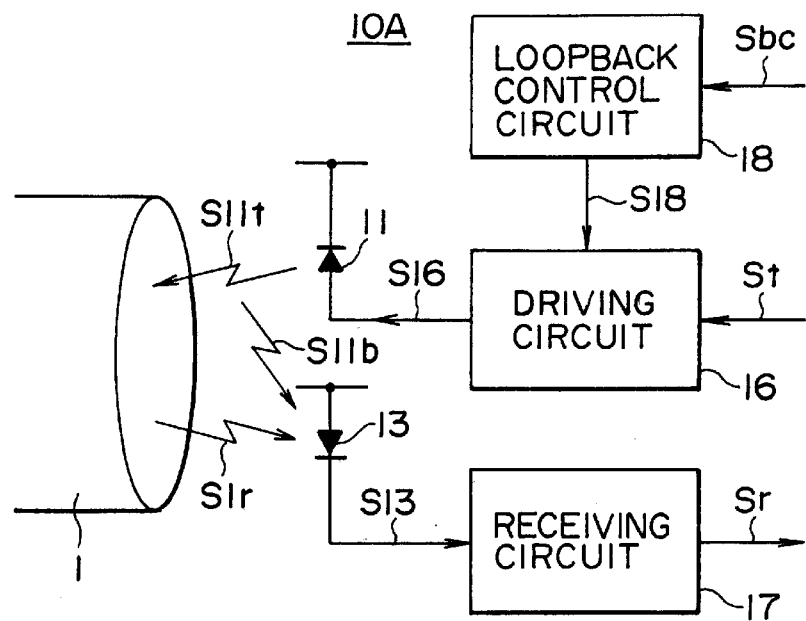
FIG. 3 is a block diagram showing the configuration of another embodiment of the present invention.

Next, a second embodiment implementing the optical transmitting/receiving apparatus provided by the present invention is explained by referring to FIG. 3. Also in the case of the second embodiment, the loopback optical signal S11b is controlled to a sufficiently low level in comparison with the received optical signal S1r but to a level that is high enough so as to allow the optical detector 13 to receive the loopback optical signal S11b normally. Thus, the second embodiment is appropriate for applications in which the conditions regarding the level of the loopback optical signal S11b can not be satisfied by merely designing the optical transmitting/receiving apparatus in accordance with the first embodiment.

The configuration of the second embodiment of the present invention is shown in FIG. 3. Components identical with those shown in FIG. 2 are denoted by the same reference numerals as the latter and the explanation of some of them is omitted.

As shown in the figure, the optical transmitting/receiving apparatus 10A comprises a laser 11 and an optical detector 13. The optical transmitting/receiving apparatus 10A is connected to an optical fiber 1 through a proper coupling mechanism in such a way that the optical fiber 1 can be connected and disconnected to and from the optical transmitting/receiving apparatus 10A with a high degree of freedom. It should be noted that the coupling mechanism itself is not shown in the figure. The optical transmitting/receiving apparatus 10A is installed so as to face an end surface of the optical fiber 1.

Part of an optical signal output by the laser 11 is radiated to the inside of the optical fiber 1 as a transmitted optical signal S11t. The transmitted optical signal S11t propagates through the inside of the optical fiber 1, arriving at an optical transmitting/receiving apparatus of a communication partner which is not shown in the figure. On the other hand, an inputting optical signal S1r transmitted by the communication partner through the optical fiber 1 enters the optical detector 13.

A loopback optical signal S11b, that is, the rest of the optical signal output by the laser 11, is also radiated to the optical detector 13.

The received optical signal S1r and the loopback optical signal S11b are each converted into an electrical signal S13 by the optical detector 13.

In a receiving circuit 17, on the other hand, a received current signal supplied thereto from the optical detector 13 is converted into a voltage signal which is then amplified and waveshaped before being output as a received signal Sr.

The configuration described above is identical with the optical transmitting/receiving apparatus 10 implemented by the first embodiment as described earlier.

In the case of the optical transmitting/receiving apparatus 10A implemented by the second embodiment, in a driving circuit 16, a laser driving signal S16 is generated in accordance with the transmitted signal St. In a loopback control circuit 18, on the other hand, a driving circuit control signal S18 is generated in accordance with a loopback control signal Sbc.

The driving circuit control signal S18 is used for controlling the driving circuit 16. To put it in detail, in a loopback operation to carry out a shipping test or a self-diagnosis with the optical transmitting/receiving apparatus 10A disconnected from the optical fiber 1, the driving circuit control signal S18 is supplied to the driving circuit 16 so as to amplify or attenuate the optical signal output by the laser 11.

For example, in the case of the previous embodiment described earlier with the configuration thereof remaining unchanged as it is, the level of the loopback optical signal S11b may not be high enough for a shipping test or a self-diagnosis. In the case of the optical transmitting/receiving apparatus 10A implemented by the present embodiment, however, while the loopback control signal Sbc is being supplied to the loopback control circuit 18, the driving circuit control signal S18 generated by the loopback control circuit 18 controls the driving circuit 16 so as to drive the laser 11 with a power greater than that of a normal operation.

As a result, the optical output of the laser 11 is increased and, at the same time, the level of the loopback optical signal S11b is raised, allowing the optical detector 13 to receive the loopback optical signal S11b with a high degree of reliability.

As described above, in the present embodiment, the transmitted optical signal can thus be looped back to the receiving circuit without the necessity to specially prepare an optical fiber for the loopback purpose and, at the same time, the level of the loopback optical signal S11b can be adjusted. As a result, a shipping test and a self-diagnosis of the optical transmitting/receiving apparatus including optical devices can be carried out with ease and without the need for an optical fiber, allowing a problem that would otherwise be encountered in the field to be identified easily.

Figure 4:
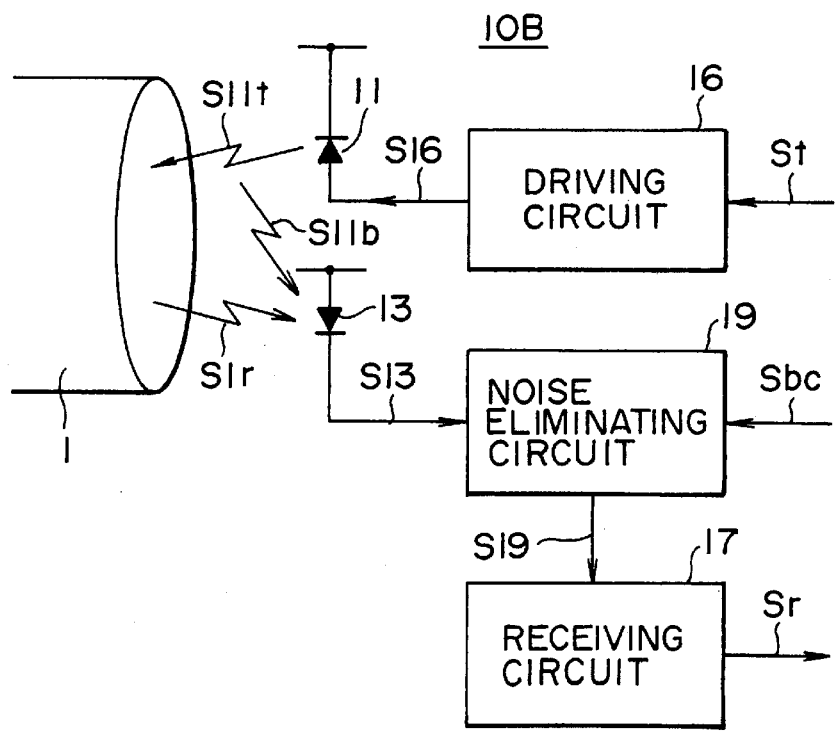
FIG. 4 is a block diagram showing the configuration of a further embodiment of the present invention.

Next, a third embodiment implementing the optical transmitting/receiving apparatus provided by the present invention is explained by referring to FIG. 4.

The configuration of the third embodiment of the present invention is shown in FIG. 4. Components identical with those shown in FIG. 3 are denoted by the same reference numerals as the latter and the explanation of some of them is omitted.

As shown in the figure, the optical transmitting/receiving apparatus 10B comprises a laser 11 and an optical detector 13. The optical transmitting/receiving apparatus 10B is connected to an optical fiber 1 through a proper coupling mechanism in such a way that the optical fiber 1 can be connected and disconnected to and from the optical transmitting/receiving apparatus 10B with a high degree of freedom. It should be noted that the coupling mechanism itself is not shown in the figure. The optical transmitting/receiving apparatus 10B is installed so as to face an end surface of the optical fiber 1.

Part of an optical signal output by the laser 11 is radiated to the inside of the optical fiber 1 as a transmitted optical signal S11t. The transmitted optical signal S11t propagates through the inside of the optical fiber 1, arriving at the optical transmitting/receiving apparatus of the communication partner which is not shown in the figure. On the other hand, an inputting optical signal S1r transmitted by the communication partner through the optical fiber 1 enters the optical detector 13.

A loopback optical signal S11b, that is, the rest of the optical signal output by the laser 11, is also radiated to the optical detector 13.

The received optical signal S1r and the loopback optical signal S11b are each converted into an electrical signal S13 by the optical detector 13.

The configuration described above is identical with the optical transmitting/receiving apparatuses 10 and 10A implemented by the first and second embodiments shown in FIGS. 2 and 3 respectively as described earlier.

In the case of the optical transmitting/receiving apparatus 10B implemented by the third embodiment, in a driving circuit 16, a laser driving signal S16 is generated in accordance with the transmitted signal St and supplied to the laser 11.

A current signal S13 received from the optical detector 13 is supplied to a noise eliminating circuit 19 which also receives a loopback control signal Sbc.

Then, a signal S19 output by the noise eliminating circuit 19 is supplied to the receiving circuit 17 for converting the signal S19 into a voltage signal which is then amplified and waveshaped before being output as a received signal Sr.

In the case of the optical transmitting/receiving apparatus 10B implemented by the present embodiment, in a normal operation wherein an optical signal S1r received from a communication partner through the optical fiber 1 enters the optical detector 13, the noise eliminating circuit 19 eliminates noise included in a current signal S13 received from the optical detector 13, that is, a current signal component of the current signal S13 corresponding to the loopback optical signal S11b, outputting only a current signal component corresponding to the received optical signal S1r to the receiving circuit 17 as a noise elimination output signal S19.

In a loopback operation to carry out a shipping test or a self-diagnosis with the optical transmitting/receiving apparatus 10B disconnected from the optical fiber 1, on the other hand, the noise eliminating circuit 19 cancels the operation of the elimination of the loopback optical signal S11b described above, allowing the electrical signal S13 received by the optical detector 13 to represent the loopback optical signal S11b to be supplied to the receiving circuit 17 as it is as the noise elimination output signal S19.

In this way, the effective sensitivity of the receiving circuit 17 during a loopback operation is raised, allowing the loopback optical signal S11b to be received by the receiving circuit 17 with a high degree of reliability.

As described above, in the present embodiment, the transmitted optical signal can thus be looped back to the receiving circuit without the necessity to specially prepare an optical fiber for the loopback purpose and, at the same time, the effective sensitivity of the receiving circuit 17 can be adjusted properly during a loopback operation. As a result, a shipping test and a self-diagnosis of the optical transmitting/receiving apparatus including optical devices can be carried out with ease, allowing a problem that would otherwise be encountered in the field to be identified easily.

As described above, in the second and third embodiments, the optical output signal to be transmitted is adjusted separately from the control of the noise eliminating circuit. It should be noted, however, that it is possible to provide a configuration wherein the optical output signal to be transmitted is adjusted by the same means as the control of the noise eliminating circuit.

In addition, the second and third embodiments adopt a configuration wherein the signal for controlling the loopback operation is supplied by an external source. It is worth noting, however, that the loopback control circuit can be supplied automatically at the point of time the optical transmitting/receiving apparatus is disconnected from the optical fiber.

As described above, according to the present invention, without the necessity to specially prepare an optical fiber for the loopback purpose, a shipping test and a self-diagnosis of the optical transmitting/receiving apparatus including optical devices can be carried out with ease, allowing a problem that would otherwise be encountered in the field to be identified easily.

What is claimed is:

1. An optical transmitting/receiving apparatus comprising:

a transmitting means for transmitting an optical signal through an optical fiber installed at an end surface of said optical fiber, said optical transmitting/receiving apparatus and said optical fiber connectable to and disconnectable from said optical transmitting/receiving apparatus;

a receiving means for receiving an optical signal received from said optical fiber;

a loopback prism for looping back at least a portion of said optical signal transmitted by said transmitting means to said receiving means; and a transmission level control means for controlling the level of said optical signal transmitted by said transmitting means.

2. An optical transmitting/receiving apparatus according to claim 1 wherein:

said receiving means has a signal-eliminating means for eliminating an electrical signal representing said optical signal looped back by said loopback prism; and said signal eliminating means controlled in accordance with whether said optical fiber is connected to or disconnected from said optical transmitting/receiving means.

3. An optical transmitting/receiving apparatus according to claim 1 wherein said transmission level control means is controlled in accordance with whether said optical fiber is connected to or disconnected from said optical transmitting/receiving means.

4. An optical transmitting/receiving apparatus according to claim 1 wherein said optical signal looped back by said loopback prism is conducted internally through said prism.

5. An optical transmitting/receiving apparatus comprising:

a transmitting means for transmitting an optical signal through an optical fiber, said transmitting means installed at an end surface of said optical fiber, said optical transmitting/receiving apparatus and said optical fiber connectable to and disconnectable from said optical transmitting/receiving apparatus with a high degree of freedom;

a receiving means for receiving an inputted optical signal received through said optical fiber;

a loopback means for looping back said optical signal transmitted by said transmitting means to said receiving means;

a detachment means used as a test apparatus for disconnecting said optical fiber when testing said optical transmitting/receiving apparatus; and a transmission level control means for controlling the level of said optical signal transmitted by said transmitting means.

6. An optical transmitting/receiving apparatus according to claim 5 wherein:

said receiving means has a signal-eliminating means which is used for eliminating an electrical signal representing said optical signal looped back by said loopback means in a normal operation other than an operation to test said optical transmitting/receiving apparatus; and operations of said signal-eliminating means are controlled in accordance with whether said optical fiber is connected to or disconnected from said optical transmitting/receiving means.

7. An optical transmitting/receiving apparatus according to claim 5 wherein operations of said transmission level control means are controlled in accordance with whether said optical fiber is connected to or disconnected from said optical transmitting/receiving means.

8. An optical transmitting/receiving apparatus according to claim 5 wherein said loopback means comprises a prism.

9. An optical transmitting/receiving device for transmitting an optical signal into an optical pathway and for receiving an optical signal from the optical pathway, comprising:

an electrically-controlled optical transmitter for transmitting an optical signal in response to an electrical signal;

an optical-signal detector for receiving an optical signal and providing an electrical output therefrom;

a prism for receiving an optical signal and providing that received optical signal to said detector and for accepting an optical signal provided by said optical transmitter and providing a first and a second portion thereof, the second portion thereof provided to said optical-signal detector.

10. The optical transmitting/receiving apparatus of claim 9, wherein said first portion is provided to an optical pathway.

11. The optical transmitting/receiving apparatus of claim 10, wherein said prism includes a surface inclined to the optical transmitter and from which said first portion of the optical signal provided by said optical transmitter is reflected therefrom and through which said second portion of the optical signal from said optical transmitter is provided to said optical-signal detector.

12. The optical transmitting/receiving apparatus of claim 9, where in said second portion of the optical signal from said optical transmitter is conducted internally through said prism to said optical signal detector.

13. The optical transmitting/receiving apparatus of claim 9, wherein said optical transmitter comprises a laser.

14. An optical transmitting/receiving device for transmitting an optical signal into an optical fiber and for receiving an optical signal from the optical fiber, comprising:

an optical fiber having a surface portion thereof through which optical signals are transmitted thereinto and received therefrom;

an electrically-controlled optical transmitter for transmitting an optical signal in response to an electrical signal;

an optical-signal detector for receiving an optical signal and providing an electrical output therefrom;

a prism for receiving an optical signal from said surface portion of said optical fiber and providing that received optical signal to said detector and for accepting an optical signal provided by said optical transmitter and providing a first portion thereof to said surface portion of said optical fiber and providing a second portion thereof to said optical-signal detector.

15. The optical transmitting/receiving apparatus of claim 14, wherein said prism includes a surface inclined relative to the optical transmitter and from which said first portion of the optical signal provided from said optical transmitter is reflected therefrom to said surface portion of said optical fiber and through which said second portion of the optical signal from said optical transmitter is provided to said optical-signal detector.

16. The optical transmitting/receiving apparatus of claim 15, where in said second portion of the optical signal from said optical transmitter is conducted internally through said prism to said optical signal detector.

17. The optical transmitting/receiving apparatus of claim 14, further comprising a driving circuit connected to said optical signal transmitter to effect control thereof.

18. The optical transmitting/receiving apparatus of claim 17, further comprising a control circuit connected to said driving circuit to at least selectively increase the power output of said optical-signal transmitter.

19. The optical transmitting/receiving apparatus of claim 14, further comprising a receiving circuit for processing the output of said optical-signal detector.

20. The optical transmitting/receiving apparatus of claim 19, further comprising a noise-eliminating circuit coupled to said receiving circuit for eliminating said second portion of the optical signal from said optical transmitter present in the output of said optical-signal detector.

21. The optical transmitting/receiving apparatus of claim 14, wherein said optical transmitter comprises a laser.

* * * * *